UNITED STATES PATENT OFFICE.

LOUIS M. DENNIS, OF ITHACA, NEW YORK.

MANUFACTURE OF HYDROXY COMPOUNDS OF AROMATIC HYDROCARBONS.

1,320,454.              Specification of Letters Patent.        Patented Nov. 4, 1919.

No Drawing.        Application filed February 6, 1917. Serial No. 146,903.

*To all whom it may concern:*

Be it known that I, LOUIS M. DENNIS, a citizen of the United States of America, and resident of Ithaca, Tompkins county, State of New York, have invented a new and useful Improvement in the Manufacture of Hydroxy Compounds of Aromatic Hydrocarbons, of which the following is a specification.

My invention relates to a process of treating aromatic hydrocarbons wherein the hydrocarbon is sulfonated to form a sulfonic acid of that hydrocarbon, the sulfonic acid separated from the excess of sulfuric acid and neutralized with a suitable base or salt, the resulting sulfonate fused with an alkali hydroxid to form a salt of the hydroxy compound of the hydrocarbon, the hydroxy compound set free by treatment of an aqueous solution of this salt with $CO_2$ the hydroxy compound being then separated from the solution and the residual carbonate liquor treated so as to separate and recover from it substantially pure alkali carbonate, which carbonate may be used to neutralize the sulfonic acid obtained as above.

Up to the present time, so far as I am aware, with the exception of the processes disclosed by me in my U. S. Letters Patent No. 1,211,923, dated January 9, 1917 and No. 1,212,612, dated January 16, 1917, no process has been placed in successful commercial operation whereby sulfonic acid has been separated from the excess of sulfuric acid and obtained substantially free therefrom. I make use of my disclosures in said patents referred to in this present process.

Furthermore in processes of this character where $CO_2$ has been used to set free the hydroxy compound, the resulting carbonate liquor has contained alkali sulfates and sulfites. If now this carbonate liquor be used to neutralize a sulfonic acid or a mixture of a sulfonic acid and sulfuric acid, the product contains in addition to the salt of the sulfonic acid appreciable quantities of the sulfate, which latter is prejudicial to the subsequent successful working of the process.

Moreover, the sulfite present in the carbonate liquor will be decomposed on neutralization and thus lost, unless the $SO_2$ gas is recovered by some suitable process.

My new process obviates the disadvantages and losses caused by the presence of appreciable amounts of sulfates and sulfites in the neutralizing liquor.

I shall describe my process in connection with the formation of phenol from benzene mono-sulfonic acid although the process is as well applicable to the formation of other hydroxy compounds, such as are derivable from benzene di-sulfonic acids and napthalene sulfonic acids.

Benzene is sulfonated with sulfuric acid, preferably with fuming sulfuric acid, and the resulting mixture of benzene sulfonic acid and sulfuric acid treated with a solvent which will dissolve the sulfonic acid but not the sulfuric acid and the sulfonic acid extracted with water from this solution as set forth in my U. S. Letters Patent above referred to.

The sulfonic acid is then neutralized by a suitable salt or base, preferably sodium carbonate substantially free from sulfates or sulfites, and obtained in the manner described below, or by sodium hydroxid obtained from such sodium carbonate. The sodium benzene sulfonate thus formed is fused with solid sodium hydroxid to form sodium phenolate. Sodium sulfite and sodium sulfate are also formed in this fusion. The product of the fusion, consisting of sodium phenolate, sulfate and sulfite, is then dissolved in water and $CO_2$ passed through the solution. This results in the liberation of phenol, which is separated from the solution by suitable means, and there remains carbonate liquor containing sodium carbonate, sodium bicarbonate, sodium sulfate and sodium sulfite.

This carbonate liquor is not suitable for the neutralization of the separated sulfonic acid obtained as above, for the reason that the resulting sodium sulfonate, sodium benzene sulfonate in the example given, will be contaminated by the sodium sulfate in the carbonate liquor and the sulfite in the carbonate liquor will be decomposed and the $SO_2$ lost.

For these reasons I treat the carbonate liquor in such manner as to substantially separate the sodium carbonate contained therein from the sodium sulfite and sodium sulfate and use the sodium carbonate thus recovered for the neutralization of the sulfonic acid as above set forth. One way of so separating the sodium carbonate is to evaporate the carbonate liquors to such a concentration that upon cooling, sodium carbonate substantially free from sodium sulfate and sodium sulfite, will separate out in solid form.

I do not restrict my invention to its use in connection with any particular aromatic hydrocarbon or to the formation of any particular hydroxy compound thereof, further than the scope of the appended claims demands.

I claim:

1. A process of treating aromatic hydrocarbons consisting in sulfonating the hydrocarbon with sulfuric acid in excess, freeing the sulfonic acid from the residual sulfuric acid, then neutralizing the separated sulfonic acid, fusing the sulfonate thus produced with an alkali metal hydroxid to form a salt of a hydroxy compound of the hydrocarbon with formation of the sulfate and sulfite of the alkali metal of the alkali metal hydroxid, treating an aqueous solution of the products of the fusion with $CO_2$ to form a hydroxy compound of the hydrocarbon with formation of the carbonates of the alkali metal of the alkali metal hydroxid, freeing the hydroxy compound from the solution and separating out the alkali carbonates substantially free from sulfate and sulfite.

2. A process of treating aromatic hydrocarbons consisting in sulfonating the hydrocarbon with sulfuric acid in excess, freeing the sulfonic acid from the residual sulfuric acid, then neutralizing the separated sulfonic acid with an alkali metal carbonate, fusing the sulfonate thus produced with an alkali metal hydroxid to form a salt of a hydroxy compound of the hydrocarbon with formation of the sulfate and sulfite of the alkali metal of the alkali metal hydroxid, treating an aqueous solution of the products of the fusion with $CO_2$ to form a hydroxy compound of the hydrocarbon with formation of the carbonates of the alkali metal of the alkali metal hydroxid, freeing the hydroxy compound from the solution and separating out the alkali carbonates substantially free from sulfate and sulfite.

3. A process of treating aromatic hydrocarbons consisting in sulfonating the hydrocarbon with sulfuric acid in excess, freeing the sulfonic acid from the residual sulfuric acid, then neutralizing the separated sulfonic acid with sodium carbonate, fusing the sulfonate thus produced with sodium hydroxid to form a sodium salt of a hydroxy compound of the hydrocarbon with formation of sodium sulfate and sodium sulfite, treating an aqueous solution of the products of the fusion with $CO_2$ to form a hydroxy compound of the hydrocarbon with formation of sodium carbonate and sodium bicarbonate, freeing the hydroxy compound from the solution and separating out the sodium carbonate and sodium bicarbonate substantially free from sodium sulfate and sodium sulfite.

4. A process of treating aromatic hydrocarbons which comprises sulfonating the hydrocarbon with sulfuric acid in excess, freeing the sulfonic acid from the residual sulfuric acid, then neutralizing the separated sulfonic acid with alkali comprising sodium carbonate, fusing the dried sodium sulfonate thus produced with caustic soda, passing $CO_2$ containing gases into an aqueous solution of the fused material whereby sodium carbonate is formed, separating the sodium carbonate from the liquor and employing the separated sodium carbonate substantially free from other compounds to neutralize another portion of the sulfonic acid.

5. A process of treating benzene consisting in sulfonating the benzene with sulfuric acid in excess, freeing the benzene sulfonic acid from the residual sulfuric acid, then neutralizing the separated sulfonic acid, fusing the sulfonate thus produced with an alkali metal hydroxid to form a phenolate with formation of the sulfate and sulfite of the alkali metal of the alkali metal hydroxid, treating an aqueous solution of the products of the fusion with $CO_2$ to form phenol with formation of the carbonates of the alkali metal of the alkali metal hydroxid, freeing the phenol from the solution and separating out the alkali carbonates substantially free from sulfate and sulfite.

6. A process of treating benzene consisting in sulfonating the benzene with fuming sulfuric acid, freeing the benzene sulfonic acid from the residual sulfuric acid, then neutralizing the separated sulfonic acid with sodium carbonate, fusing the sulfonate thus produced with sodium hydroxid to form sodium phenolate with formation of sodium sulfate and sodium sulfite, treating an aqueous solution of the products of the fusion with $CO_2$ to form phenol with formation of sodium carbonate and sodium bicarbonate, freeing the phenol from the solution and separating out the carbonates substantially free from sulfate and sulfite.

7. A process of treating benzene which comprises sulfonating the benzene with sulfuric acid in excess, freeing the sulfonic acid from the residual sulfuric acid, then neutralizing the separated sulfonic acid with alkali comprising sodium carbonate, fusing the dried sodium benzene sulfonate thus produced with caustic soda, passing $CO_2$ containing gases into an aqueous solution of the fused material whereby sodium carbonate is formed, separating the sodium carbonate from the liquor and employing the separated sodium carbonate substantially free from other compounds to neutralize another portion of the sulfonic acid.

In testimony whereof I have signed this specification.

LOUIS M. DENNIS.